Jan. 3, 1956  R. STEVENSON  2,729,234
SURGE VALVE
Filed Nov. 1, 1951
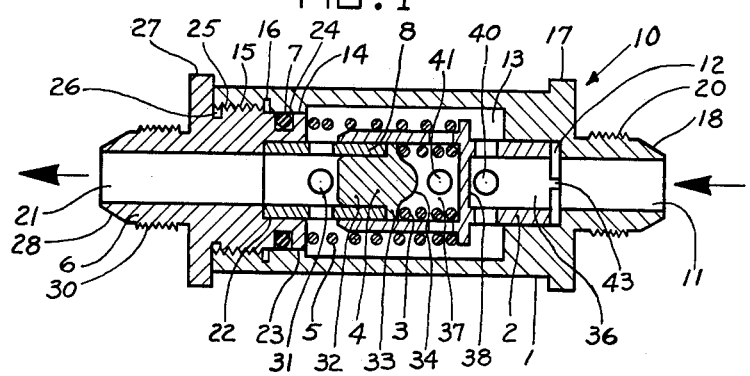
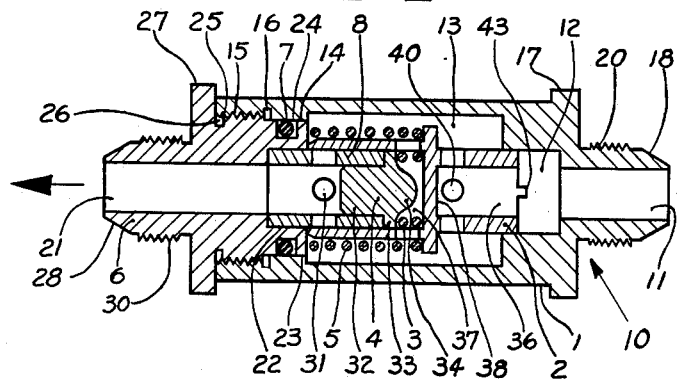
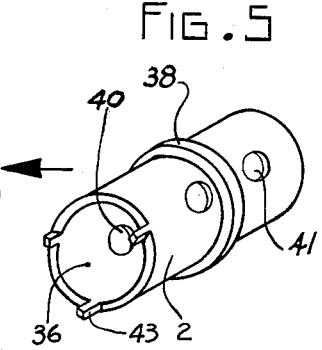
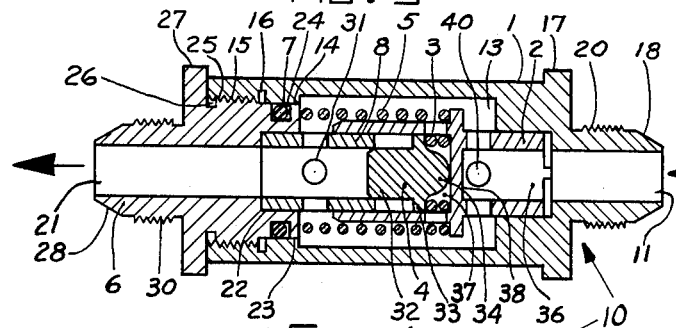
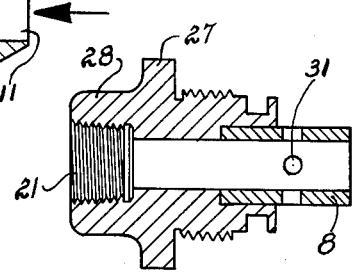
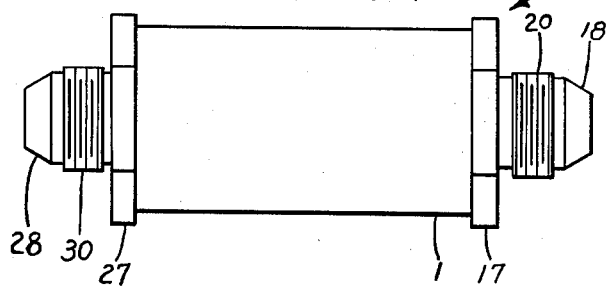
INVENTOR.
ROBERT STEVENSON
BY
William Frederick Werner
ATTORNEY

United States Patent Office 2,729,234
Patented Jan. 3, 1956

2,729,234
SURGE VALVE

Robert Stevenson, Barrington, R. I., assignor to Anco, Inc., a corporation of Rhode Island Application November 1, 1951, Serial No. 254,317

5 Claims. (Cl. 137—498)

This invention relates to surge valves and more particularly to improvements in surge valves wherein any fluctuation in pressure in flow or counterflow (back pressure) direction is taken out of the fluid line.

One of the principal objects of the present invention is to provide a pressure responsive means more sensitive to changes in pressure, more economical to manufacture by having fewer parts with less machine work to be performed and lighter in weight.

Another object of the present invention is to have a pressure responsive means operable in both the flow and back pressure directions.

And still another object of the present invention is to provide means for taking the fluctuation due to pressure changes out of a hydraulic pressure system.

The surge valve is interposed in a fluid pressure conduit between a source of fluid supply and a fluid operated translating device and operable for controlling automatically the uniform flow of fluid through the conduit by operating as a dampening device.

The surge valve has means operable in response to the rate of flow of fluid through itself to momentarily stop or retard the rate of flow if the rate of flow increases to a value indicative of abnormal operating conditions. This includes back pressure or counterflow.

The means responsive to the rate of fluid flow for momentarily stopping or retarding the fluid flow comprises relatively movable valve members which operate to a closed position in response to the excessive rate of flow. As the pressure equalizes itself in the valve members they return to normal operating position under the influence of a spring.

The invention is particularly suitable for use with hydraulic systems wherein a fluid under pressure from a suitable fluid pressure apparatus such as a pump or storage tank is utilized to effect operation of a mechanism. One application of this type of hydraulic system and one with which the present invention may be readily combined to great advantage is in the operation of various movable devices on aircraft such, for example, as the retractable landing gear. In aircraft hydraulic systems a suitable liquid, such as oil, under high pressure is supplied from a motor or engine driven pump through conduits to servo-motors which operate the landing gear mechanism or other devices. While the aircraft is in flight preparatory to landing, the wheels are let down. As the wheels touch the ground there is great force exerted on the wheels which is translated as back pressure in the conduits. The surge valve would close maintaining the pressure on the fluid in the conduits thereby preventing a rupture in the conduits beyond the landing gear where the conduits would be less sturdy in construction. The surge valve would insure the required pressure at the exact moment the maximum pressure was needed.

In machine tools the conduits are frequently made of rubber due to the need of flexibility. If the rubber hose kinks a surge of pressure is created which translated to the mechanism of the machine may spell damage. The surge valve would prevent the surge of pressure from reaching the mechanism. Hence the danger of damage would be eliminated.

Other objects of the present invention will become apparent in part and be pointed out in part in the following specification and claims. Referring to the drawings wherein like reference numerals refer to like parts:

Figure 1 is a transverse sectional view of the new and improved surge valve, showing the parts in normal operating position.

Figure 2 is a transverse sectional view showing the parts in the operating position when a surge of pressure is in the supply side of the line.

Figure 3 is a transverse sectional view showing the parts in the operating position when a surge of back pressure is in the line.

Figure 4 is a side elevational view of the new and improved surge valve.

Figure 5 is a perspective view of a detailed part.

Figure 6 is a schematic view showing a modified form of the means to attach the surge valve to a fluid line.

Referring to Figures 1, 2, 3 and 4 wherein reference character 10 indicates the new and improved surge valve which consists of a body 1, provided with an inlet 11 contiguous with a cavity 12 adjacent a chamber 13 terminating in a bearing 14 relieved from an internal thread 15 by an annular recess 16. The external shape of body 1 is generally circular with a hexagonal shoulder 17 terminating in a nipple 18 provided with threads 20.

A gland 6 consists of outlet 21 terminating in a counterbore 22. The external diameter of gland 6 is provided with a sleeve 23 having an annular recess 24 adapted to house a fluid sealing element shown as comprising a neoprene O sealing ring 7 which cooperates with bearing 14 to form a fluidtight seal and is provided with external threads 25 adapted to engage internal threads 15. A groove 26 separates threads 25 from shoulder 27 which may take any convenient form to facilitate turning but which is shown as hexagonal in shape. A nipple 28 provided with threads 30 projects from shoulder 27.

A tube 8 provided with four apertures 31 is secured in counterbore 22. A plunger 4 consisting of a circular body 32 terminating in a shoulder 33 which is domed as at 34 is slidably mounted by means of circular body 32 in tube 8.

A piston 2 consisting of oppositely disposed tubes 36 and 37 integrally attached to a wall 38 is provided with four apertures 40 in tube 36 and four apertures 41 in tube 37. The end of tube 36 is flat and provided with three prongs 43. Tube 36 is slidably mounted in cavity 12. Tube 8 and the outside diameter of shoulder 33 are slidably mounted in tube 37. A spring 3 is housed in tube 37 with one end of the spring working against shoulder 33 and the other end of spring 3 working against wall 38. A second spring 5 housed in chamber 13 has one end working against wall 38 and the other end working against the end of gland 6.

In operation fluid under pressure will flow through inlet 11 into tube 36 acting against wall 38. If the force of the pressure is sufficient to overcome spring 5, tube 37 will block out apertures 31 thereby preventing the fluid which has flowed through apertures 40 into chamber 13 from entering said apertures 31. If however the fluid pressure is not sufficient to overcome spring 5, the fluid will flow through apertures 31 through tube 8 into outlet 21.

Fluid in chamber 13 will flow through apertures 41 into tube 37 and act against dome 34 and wall 38 thereby equalizing the pressure in the surge valve 10. Should back pressure be created and reverse the flow of fluid in outlet 21, the fluid will enter tube 8 and act against circular body 32 forcing plunger 4 against spring 3 thus creating a slightly greater area for the fluid to flow into in tube 8, thus relieving the pressure. Should dome 34 be forced against wall 38, apertures 41 would still remain unblocked and receive fluid, thus maintaining the balance of pressure in the surge valve 10.

Having shown and described by way of example, one preferred embodiment of the present invention I do not limit myself to the exact structure shown because structural changes can be made without departing from the spirit or the contribution made in the surge valve art.

1. In a surge valve, a body having a geometric shaped exterior, a nipple forming an integral part of said exterior adapted to be attached to a fluid pressure conduit, an inlet in said nipple adjacent a cavity terminating in a chamber having a reduced portion forming a bearing relieved from an internal thread by means of an annular recess in said body, a gland having a geometric shaped exterior, a nipple forming an integral part of said exterior adapted to be attached to a fluid pressure conduit, an outlet in said nipple adjacent a counterbore in said gland, a sleeve provided with a recess containing fluidtight packing material engaging said bearing, a thread adjacent said sleeve relieved from said geometric shaped exterior by means of a groove, said threads engageable with said internal thread in said body, a tube provided with apertures secured in said counterbore, a plunger slidably mounted in said tube, a piston consisting of oppositely disposed tubes separated by a wall, provided with apertures in each tube, prongs formed in the edge of one tube slidably mounted in said cavity, the other tube slidably mounted over the tube mounted in said counterbore and over said plunger, resilient means interposed between said wall and said gland and resilient means in said second tube interposed between said wall and said plunger.

2. In a surge valve, a body of generally circular external diameter having a hexagonal shoulder adjacent a nipple provided with pipe threads adaptably connectable to a fluid pressure conduit, an inlet in said nipple contiguous with a cavity formed in a chamber terminating in a bearing relieved from a threaded portion by means of an annular recess formed in said body, a gland of generally circular external diameter having a hexagonal shoulder adjacent a nipple provided with pipe threads adaptably connectable to a fluid pressure conduit, an external threaded portion relieved from said hexagonal shoulder by means of a groove and adapted to be connected with said threaded portion on said body, a sleeve adjacent said threaded portion engageable with said bearing, means between said sleeve and said bearing to provide a fluidtight seal, an outlet in said nipple contiguous with a counterbore, a tube secured in said counterbore having aperture of a predetermined area, a plunger slidably mounted in said tube, a piston comprising a left hand and a right hand tube oppositely disposed and separated by a wall, aperture in each tube having a predetermined area, the right hand tube being provided with end prongs slidably mounted in said cavity to vary the fluid capacity of said cavity and said chamber combined, said left hand tube being slidably mounted over said tube secured in said counterbore and over said plunger, said plunger varying the fluid capacity between said wall and one side of said plunger and the fluid capacity of said tube in said counterbore at the other side of said plunger, a coil spring interposed between said plunger and said wall and another coil spring interposed between said wall and the end of said gland.

3. In a surge valve, a body provided with an inlet contiguous with a cavity adjacent a chamber terminating in a bearing relieved from an internal thread by an annular recess, externally said body is generally circular with a hexagonal shoulder terminating in a nipple provided with threads adapted to be connected to a fluid conduit under pressure, a gland having an outlet terminating in a counterbore is provided externally with a sleeve having an annular recess adapted to house a fluid sealing element which cooperates with said bearing to form a fluidtight seal, external threads on said gland are adapted to engage said internal threads in said body, a groove separates said external threads from a hexagonal shaped shoulder, a nipple provided with threads adapted to be connected to a fluid conduit projects from said hexagonal shaped shoulder, a tube provided with four apertures is secured in said counterbore, a plunger consisting of a circular body terminating in a circular shoulder which is domed on one end is slidably mounted by means of said circular body in said tube, a piston consisting of a left hand tube and a right hand tube oppositely disposed and integrally attached to a wall, each tube of said piston is provided with a plurality of apertures in its tubular wall, the end of the right hand tube is provided with three prongs which seat at the base of said cavity, said right hand tube is slidably mounted in said cavity, said left hand tube is slidably mounted upon said tube secured in said counterbore, said circular shoulder slidably engages said left hand tube, a spring is housed in said left hand tube between said circular shoulder and said wall, a second spring is housed in said chamber between said wall and the end of said gland.

4. A surge valve for automatically controlling the uniform flow of fluid in a hydraulic conduit by blocking the flow of fluid through the surge valve when the balance of pressure of the fluid within the surge valve is upset by a fluid surge comprising a body having means to be secured to a hydraulic conduit, said body comprising an inlet contiguous to a cavity adjacent a chamber, a gland secured in said body having means to be secured to a hydraulic conduit, said gland having an outlet adjacent a counterbore, a tube provided with a plurality of apertures secured in said counterbore, a piston consisting of a left hand tube and a right hand tube oppositely disposed and separated by a wall with a plurality of apertures in each tube, slidably mounted by means of the right hand tube in said cavity, the left hand tube slidably engaging said tube secured in said counterbore, a spring interposed between said wall and said gland, said piston acting against said spring to block out said apertures in said tube secured in said counterbore in response to a fluid surge, a plunger slidably mounted in said tube secured in said counterbore, a spring interposed between said wall and said plunger, said plunger acting against said spring to withdraw from said tube secured in said counterbore in response to a fluid surge operating in a direction opposite to the direction of the surge influencing the piston.

5. A surge valve comprising a body having means to secure said body to a conduit, said body comprising an inlet contiguous to a cavity adjacent a chamber, a gland secured in said body having means to be secured to a conduit, said gland having an outlet adjacent a counterbore, a tube provided with apertures secured in said counterbore, a piston, consisting of a left hand tube and a right hand tube oppositely disposed and separated by a wall with apertures in the right hand tube, is slidably mounted by means of the right hand tube in said cavity, the left hand tube slidably engages said tube secured in said counterbore, resilient means interposed between said wall and said gland, said piston acting against said resilient means to block out said apertures in said tube secured in the counterbore in response to excess pressure passing from one conduit to the other conduit.

References Cited in the file of this patent
UNITED STATES PATENTS

| 1,956,010 | Diescher | Apr. 24, 1924 |
| 1,933,454 | Sidney | Oct. 31, 1933 |
| 1,944,088 | Linderoth | Jan. 16, 1934 |
| 2,179,144 | Buttner | Nov. 7, 1939 |
| 2,555,334 | Green | June 5, 1951 |
| 2,592,486 | Stark | Apr. 8, 1952 |
| 2,592,487 | Stark | Apr. 8, 1952 |
| 2,656,855 | Booth | Oct. 27, 1953 |
| 2,664,106 | Livers | Dec. 29, 1953 |

FOREIGN PATENTS

| 37,793 | Germany | 1886 |
| 973,539 | France | 1951 |